United States Patent [19]

Jones

[11] 4,275,508
[45] Jun. 30, 1981

[54] CLOTHES DRYER TEMPERATURE CONTROL SYSTEM

[75] Inventor: William H. Jones, Villa Park, Ill.

[73] Assignee: Eaton Corporation, Cleveland, Ohio

[21] Appl. No.: 110,580

[22] Filed: Jan. 9, 1980

[51] Int. Cl.³ ............................................. F26B 21/06
[52] U.S. Cl. ........................................... 34/43; 34/44;
34/48; 34/63; 34/133; 116/216; 73/362 AR;
338/22 R
[58] Field of Search ....... 73/361 R, 362 AR, 362 SC,
73/362.8; 338/25, 22, 28; 34/48, 63, 133, 131,
44, 43; 324/451, 65 R; 116/216

[56] References Cited

U.S. PATENT DOCUMENTS

| | | |
|---|---|---|
| 2,728,836 | 12/1955 | De Boisblanc et al. |
| 3,044,968 | 7/1962 | Ichikawa ........................... 338/22 R |
| 3,182,507 | 5/1965 | Rogen . |
| 3,231,522 | 1/1966 | Blodgett et al. ...................... 338/22 |
| 3,479,631 | 11/1969 | Harget et al. ..................... 338/22 R |
| 3,526,809 | 9/1970 | Obenhaus .............................. 338/23 |
| 3,702,030 | 11/1972 | Janke ................................... 34/48 |
| 3,707,857 | 1/1973 | Wigfall . |
| 3,728,660 | 4/1973 | Finney .............................. 338/22 R |
| 3,952,276 | 4/1976 | Walch et al. ........................... 338/28 |
| 4,132,008 | 1/1979 | Deschaaf ................................ 34/89 |

Primary Examiner—Larry I. Schwartz
Attorney, Agent, or Firm—R. J. McCloskey; R. A. Johnston; J. Haurykiewicz

[57] ABSTRACT

An electronic control system to regulate heating and cooling cycle temperatures in a clothes dryer drying program. Operation is controlled according to a preselected combination of a heating schedule and a cooling schedule. Provision is made to sense and control according to the temperature of the air used to dry articles such as clothes in the clothes dryer. Provision is further made to give a visual indication of the drying program selected and to cancel the program selected and indication thereof upon completion of the drying program or selection of an alternative program. The final state of the articles being dried is determined by tumbling the articles in the presence of heated force-convected air until the desired state of dryness is obtained and terminating the application of heat and continuing tumbling and forced-convection until the articles are cooled to a desired temperature whereupon said tumbling is terminated.

9 Claims, 7 Drawing Figures

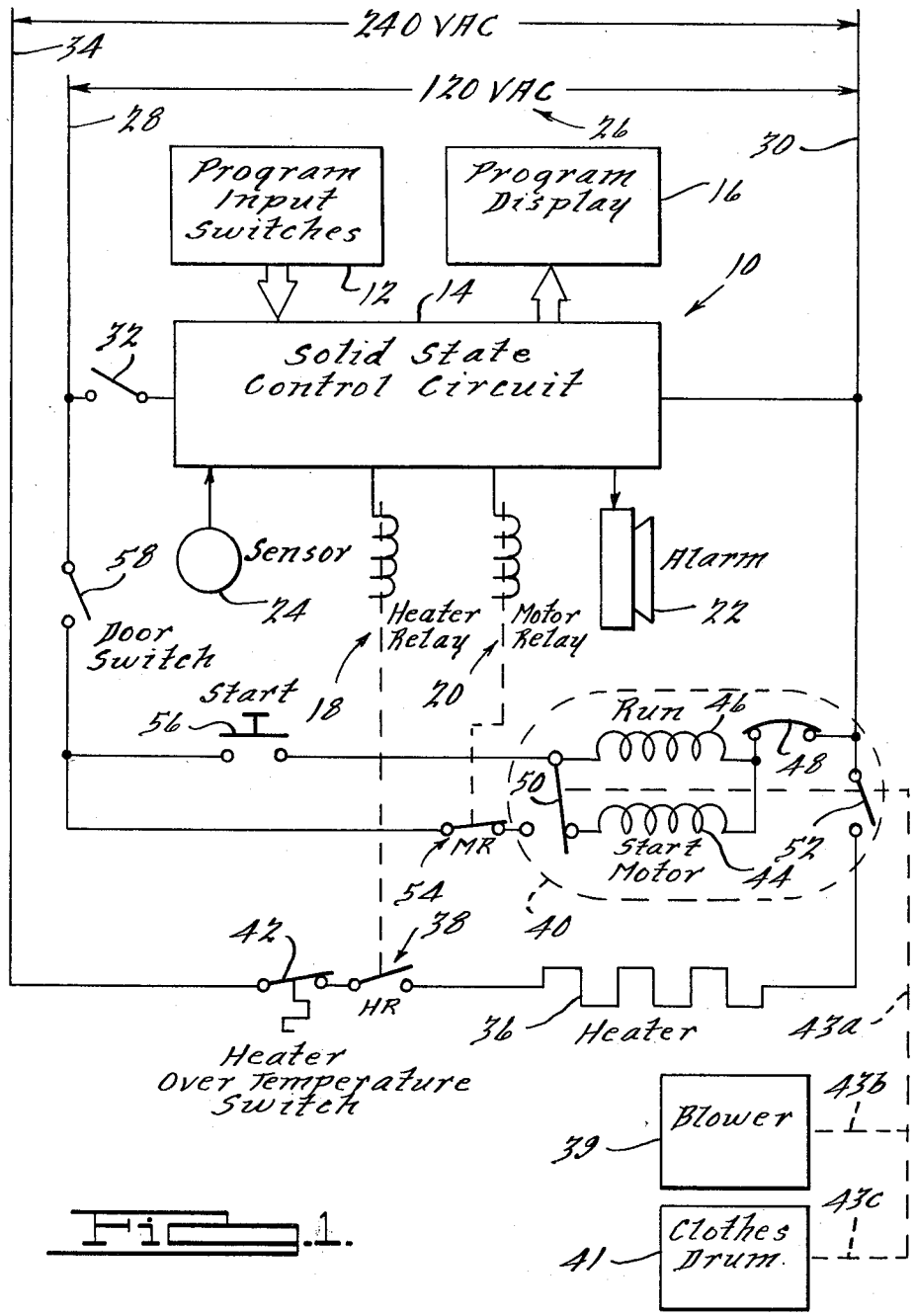

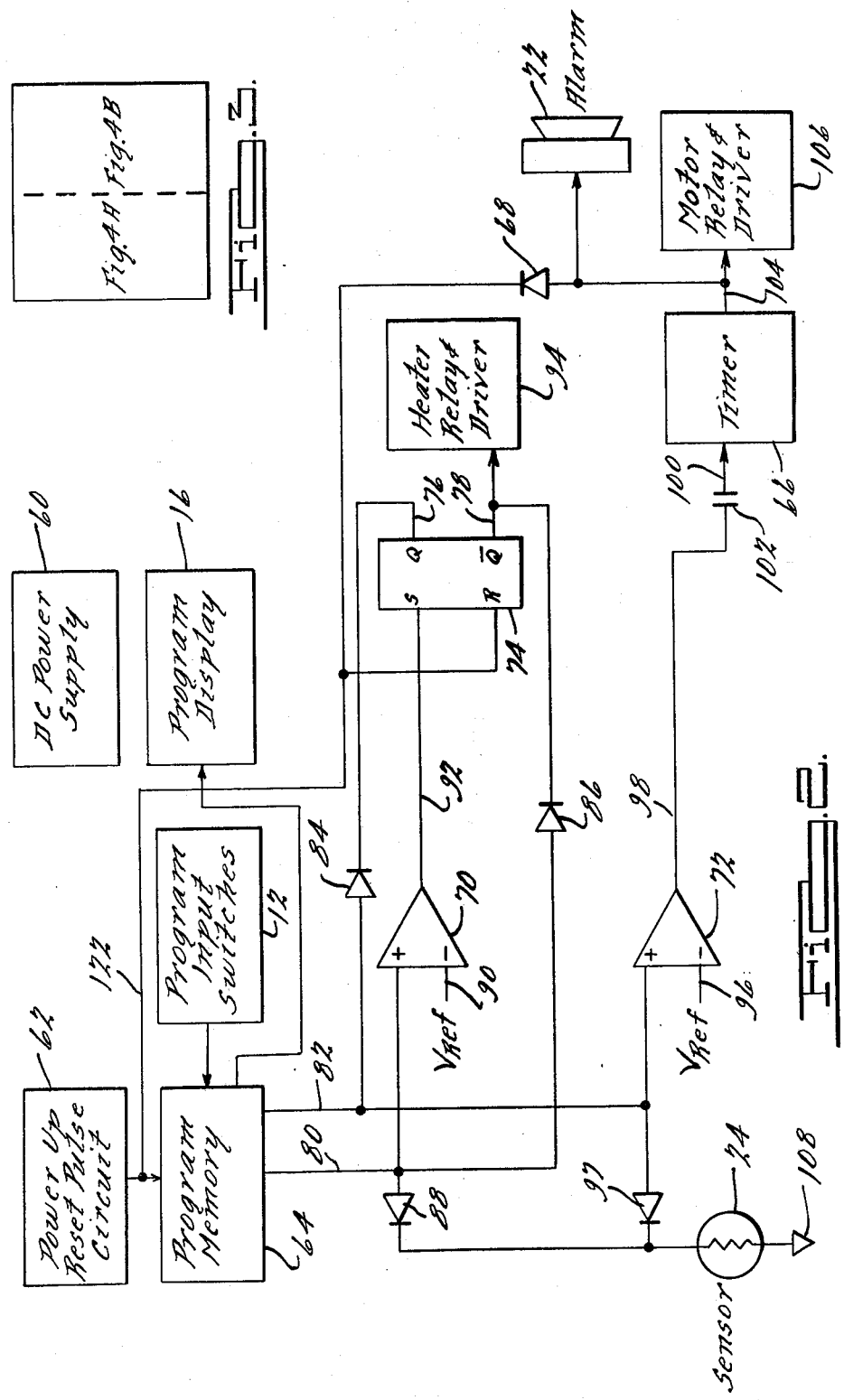

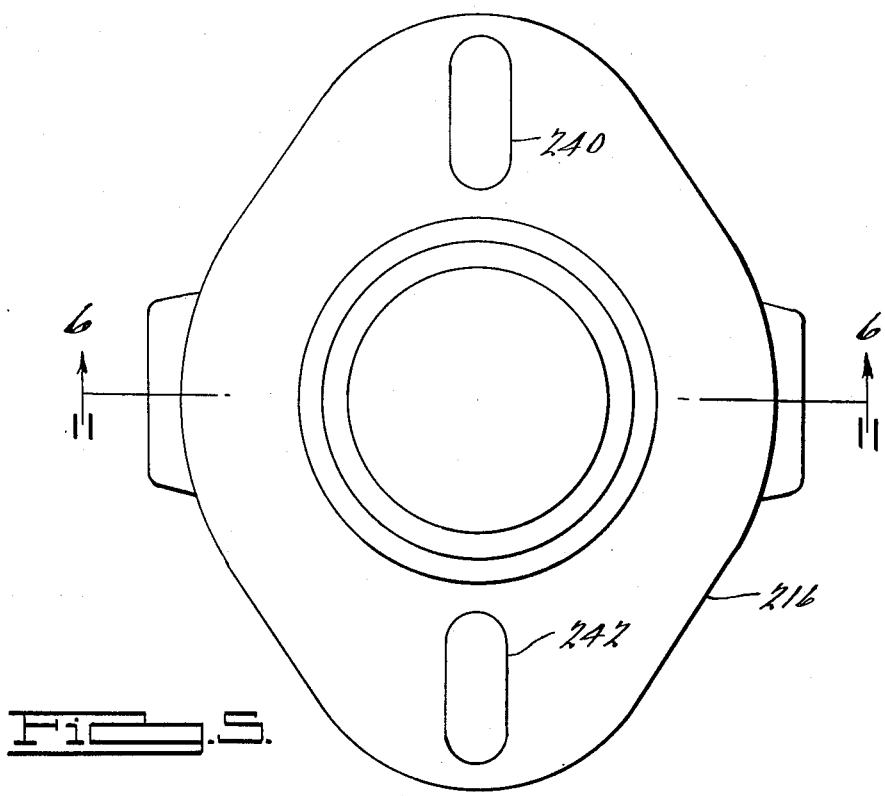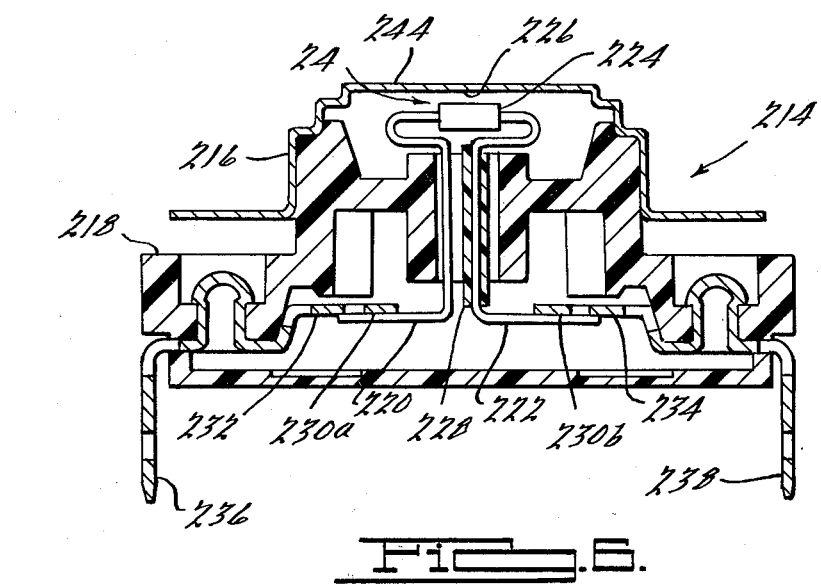

CLOTHES DRYER TEMPERATURE CONTROL SYSTEM

INTRODUCTION

This invention relates to a control system for a clothes dryer, which specifically provides a drying program based upon the air temperature and not upon a timed operation.

BACKGROUND OF THE INVENTION

Heretofore, control techniques for clothes dryers have utilized time drying periods during which moisture is removed from the clothes to be dried by passing heated air over the clothes for a fixed period of time. This resulted in a drying period which may have been longer or shorter than was needed to properly dry the clothes.

Another clothes drying technique which has been used in that of controlling the drying period according to a direct or indirect method of determining the moisture content of the clothes. In the direct method, a resistance sensor is utilized to monitor the resistance of the clothes as they are dried. As moisture is removed from the clothes, the sensed resistance increases, and the heating cycle of the drying period is terminated upon detection of a predetermined resistance. The principle employed in such a method is that the sensed resistance will indicate the percent dryness of the clothes. In the known indirect method of controlling drying of clothes, exhaust air temperature is sensed to determine percent dryness. In the indirect method it is assumed that air temperature remains relatively constant while heat input goes into changing the phase of water, i.e., evaporating it from the clothes. The indirect method operates on the principle that once the moisture is driven off, heat input goes into raising the temperature of the drying air. In one known type of indirect drying system the temperature increase is detected by a bimetal thermostat which operates at a fixed predetermined temperature.

In each of the types of clothes drying techniques just described, a cooling cycle comprising a predetermined timed portion of the drying period has been utilized to lower the temperature of the clothes. Such a timed cooling cycle has the same disadvantages of a timed heating cycle in that the clothes may not be sufficiently cooled (thereby resulting in an uncomfortable or unsafe condition when clothes are to be removed from the dryer); or, if the timed cooling cycle is in excess of that required to cool the clothes to the proper temperature, unwanted wrinkles may be set in the fabric (especially with fabrics made from certain synthetic fibers).

SUMMARY OF THE INVENTION

The present invention overcomes the above described shortcomings of timed cooling cycle clothes dryer control systems by providing a cooling cycle control system for a clothes dryer comprising a temperature sensor which provides a signal indicative of drying air temperature and a heater which is selectively actuated to heat the drying air. A selector is provided which is operable to provide a predetermined cooling schedule and includes an output indicative of the schedule selected. A control which receives the output from the selector is operative upon deactuation of the heater to cool the drying air according to the selected cooling schedule until a predetermined final temperature is detected by the temperature sensor.

According to another aspect of the invention, the drying program comprises a predetermined heating cycle and a predetermined cooling cycle. The heater is selectively actuated to heat the drying air until a desired heating temperature is obtained, whereupon the heater is deactuated. The cooling cycle is then initiated and continued until a desired final temperature as determined by the temperature sensor is reached.

Various other features and advantages of this invention will become apparent upon reading the following specification, which, together with the patent drawings, describes and discloses the preferred embodiment of the invention.

BRIEF DESCRIPTION OF THE DRAWINGS

FIG. 1 is a wiring diagram for the control system of the present invention.

FIG. 2 is a block diagram of the control system of the present invention showing important subsystems and interconnections;

FIG. 3 is a drawing key for FIGS. 4A and 4B;

FIG. 5 is a top view of the temperature sensor in its enclosure as utilized in the present invention; and FIG. 6 is a section view taken along section indicating line 6—6 of FIG. 5.

DETAILED DESCRIPTION OF THE INVENTION

Figure 4A:
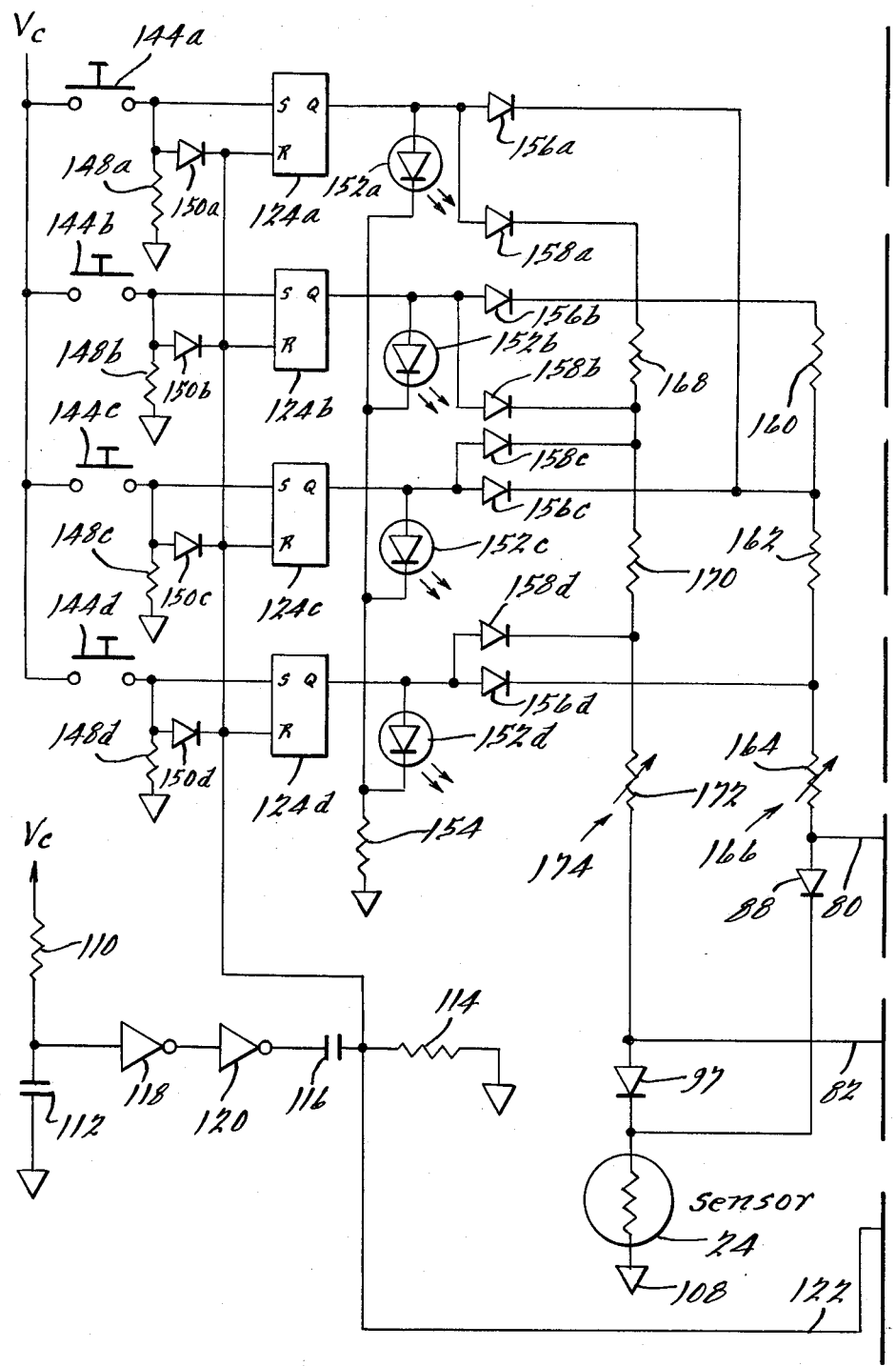
FIGS. 4A and 4B collectively comprise a detailed electrical schematic of the control system of the present invention.

In the following description, unless otherwise specifically noted, resistance values are given in ohms, capacitance values are given in microfarads, denoted "mf", and diodes are type 1N4001. Circuit common is indicated by an inverted triangle 108 in the block diagram of FIG. 2 and the electrical schematics of FIGS. 4A and 4B.

Referring to FIG. 1, a wiring diagram of the preferred embodiment of a control system (shown generally at 10) for a clothes dryer is illustrated. The control system includes a selector, or set of program input switches 12, a solic state control circuit 14, a set of visual indicators or program display 16, a heater relay 18, a motor relay 20, and an alarm 22. A sensor 24 senses drying air temperature and provides a temperature signal to the solid state control circuit 14.

Preferably, power is supplied to control system 10 from a nominal 120 volts AC, 60 Hz power source shown generally at 26, that is, such electrical power is applied between leads 28 and 30. Electrical power is applied to solid state control circuit 14 by closure of an on-off switch 32. Electrical power at a nominal 240 volts AC, 60 Hz is provided between leads 30 and 34 to power heater 36 when selectively actuated by heater relay contacts 38. A blower 39 will move air over heater 36 and the clothes to be dried in a clothes drum 41. A motor 40 drives blower 39 and clothes drum 41 through a drive belt and pulley arrangement represented by dashed lines 43a, 43b and 43c.

In the event of a failure of motor 40 or a break in drive belt 43a interconnecting motor 40 and clothes drum 41 a heater overtemperature switch 42 preferably of the known bimetal type detects an unsafe temperature and removes electrical power from heater 36.

Motor 40 is comprised of a start winding 44, a run winding 46, a thermal overload interruptor 48, a first centrifugal switch 50, and a second centrifugal switch 52. The motor wiring connections are completed through a set of motor relay contacts 54, a momentary contact push button start switch 56, and a door-open cut-out switch 58.

Operation according to the wiring diagram of FIG. 1 is as follows: on-off switch 32 is closed, power solid state control circuit 14. A predetermined drying program, as for example "woolen", "regular", "permanent press", "delicate" is selected from program input switches 12 and is indicated by program display 16. Door switch 58 is closed by closing a dryer door (not shown), and start switch 56 is momentarily closed causing motor 14 to begin rotation under operation of start winding 44. Once sufficient rotational speed has been attained by motor 40, centrifugal switch 50 transfers to a running position, disconnecting start winding 44 and powering run winding 46 through normally closed MR (motor relay) contacts 54. Centrifugal switch 52 will also close once sufficient rotational speed has been attained, thus providing a closed-circuit path between heater 36 and electrical power lead 30. Solid state control circuit 14 will then energize heater relay 18, closing normally open HR (heater relay) contacts 38, powering heater 36 which then heats the air used to dry clothes in the dryer.

In the preferred embodiment sensor 24 is located in the exhaust air passageway of clothes drum 41 to detect air temperature after it has passed over the clothes in the dryer.

Heater 36 continues to heat the air until solid state control circuit 14 receives a temperature signal from sensor 24 indicating that a predetermined heating temperature has been reached. At that point in the program circuit 14 deenergizes heater relay 18 opening the circuit to heater 36 at HR contacts 38. Motor 40 continues to run until circuit 14 detects that a desired final temperature has been reached as indicated by the temperature signal from sensor 24. Upon receipt of the final temperature signal from sensor 24 circuit 14 energizes motor relay 20, interrupting power to motor 40 at MR contacts 54, thereby stopping motor 40, sounding alarm 22 for a brief period of time to indicate the drying program is completed, and clearing circuit 14 and program display 16 of the drying program previously selected.

Referring to FIG. 2, major subsystems of electronic control system 10 are shown in block diagram form. A DC power supply 60 is used to provide DC power to the remainder of electronic control system 10. A power-up reset pulse circuit 62 clears a program memory 64 and resets a heating cycle memory or latch 74 when power is initially applied to the system. A timer 66 provides a reset pulse through diode 68 at the completion of the drying program. Also shown in FIG. 2 are heating cycle comparator 70 and a cooling cycle comparator 72, both of which are manufacturer's type MC1710 integrated circuits obtainable from Motorola, Inc., Semiconductor Group Integrated Circuits Division, 2200 West Broadway M370, Mesa, Ariz. 85201. Latch 74 is one half of an integrated circuit, manufacturer's type CD4027, obtainable from RCA Corporation, 30 Rockefeller Plaza, New York, N.Y. 10020. Latch 74 is designated a J-K Master-Slave Flip-Flop by the manufacturer, however, as used in control system 10, latch 74 is connected to operate as an S-R (set-reset) flip-flop.

Since reset after initial power application, the Q output of latch 74 will apply a logic low (hereinafter "0") to lead 76; and a logic high (hereinafter "1") will be applied to lead 78 from the $\bar{Q}$ ("Q-not") output of latch 74. In the preferred embodiment disclosed herein, "0" corresponds to a nominal 0 volts and "1" corresponds nominally to a DC supply voltage "$V_c$" of +12 volts.

Upon selection of a predetermined drying program comprising a heating cycle and a cooling cycle through program input switches 12, a predetermined heating schedule output signal associated with a desired heating temperature will be applied to lead 80 by program memory 64, and a predetermined cooling schedule will be available from program memory 64 at lead 82; however latch 74 (while reset) will hold lead 82 at a nominal +0.5 volts through diode 84. Since the voltage on lead 80 is less than that corresponding to a "1", a diode 86 is reverse biased, blocking the "1" on lead 78 from affecting the voltage on lead 80. A diode 88 connects the heating schedule output signal on lead 80 to sensor 24. Although other similar devices may readily be utilized, in the preferred embodiment sensor 24 is a manufacturer's type TSP 102 thermistor, obtainable from Texas Instruments Corporation, P.O. Box 225474, Dallas, Tex. 75265. Sensor 24 is preferably a positive temperature coefficient thermistor having a nominal 1000 ohms resistance at 25° C. and a linear coefficient of 0.7%/C.°. Sensor 24 is located so as to be sensitive to drying air temperature, and will exhibit a change in resistance linearly proportional to the sensed temperature.

Sensor 24 will increase in resistance as the temperature of drying air increases, raising the voltage on lead 80 until it equals a reference voltage on lead 90 connected to the inverting input of comparator 70. When the voltage on lead 80 equals the voltage on lead 90 the output of comparator 70 on lead 92 switches from a "0" to a "1". Latch 74 is "set" causing lead 76 to go to a "1" and lead 78 to go to a "0". Heater 36 is thereby turned off through a heater relay and driver 94; and diode 86 is forward biased holding lead 80 to a nominal +0.5 volts, thus removing the heating schedule output signal from sensor 24. Diode 84 is reverse biased, enabling the cooling schedule available on lead 82 from program memory 64 to be applied to sensor 24 through a diode 97. At this point in the drying program the voltage on lead 82 is greater than a reference voltage on lead 96 connected to the inverting input of comparator 72. The output of comparator 72 will thereupon switch from a "0" to a 1 on lead 98, thus effecting a crossover from the heating cycle to the cooling cycle of the drying program. Since heater 36 has been deactuated, drying air temperature will decrease causing sensor 24 to decrease in resistance, resulting in a decrease in voltage on lead 82 until the voltage on lead 82 equals the reference voltage on lead 96. At this point in the cooling cycle, the signal on lead 98 will switch from a "1" to a "0", causing a negative-going pulse to appear on lead 100, coupled by a 0.05 mf capacitor 102. The negative-going pulse on lead 100 will trigger a timer 66. Although any suitable timer may be employed, in the present practice of the invention a manufacturer's type LM555, obtainable from National Semiconductor Corporation, Semiconductor Division, 2900 Semiconductor Drive, Santa Clara, Calif. 95050 has been found satisfactory. Timer 66 operates as a monostable multivibrator which provides a nominal 60 second "1" output pulse on lead 104, sounding alarm 22 for one minute, (indicating the completion of the drying program), and providing a reset pulse through diode 68, and energizing motor relay and driver 106, thus stopping motor 40 (in FIG. 1).

Figure 4B:
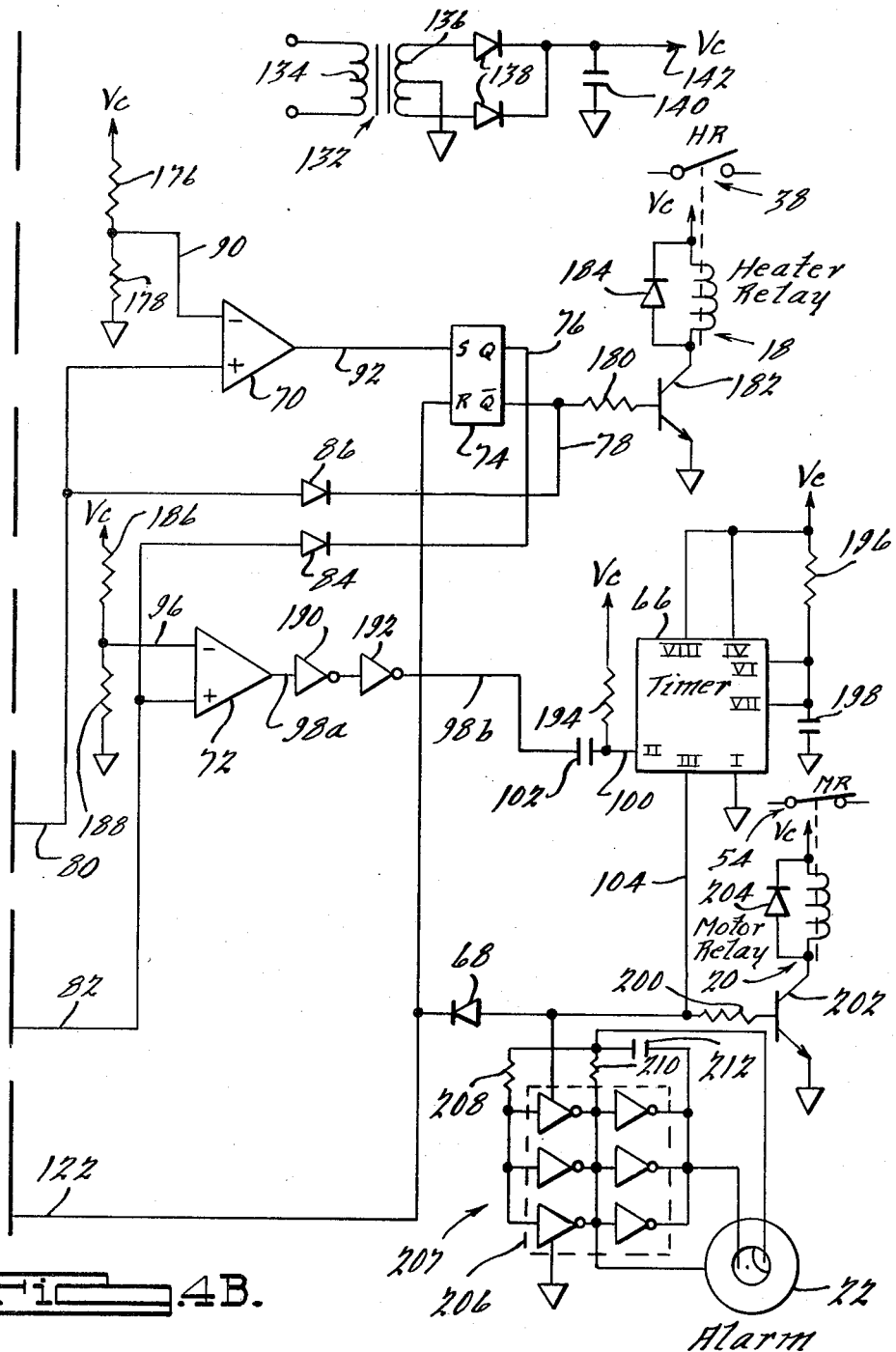

Referring particularly to FIGS. 4A and 4B, power-up reset pulse circuit 62 is comprised of a 330K resistor 110, a 0.1 mf capacitor 112, a 10K resistor 114, a 0.1 mf capacitor 116 and two digital logic inverters 118 and 120. In the preferred embodiment, digital logic inverters 118 and 120 are as contained in a Hex Inverter/Buffer integrated circuit, RCA manufacturer's type CD4049. Power-up reset pulse circuit 62 provides a nominal 10 ms "1" pulse on reset lead 122 when power is first applied to resistor 110. The reset pulse on lead 122 resets latches 124a through 124d, which latches comprise, in conjunction with associated circuitry, program memory 64.

Referring particularly to FIG. 4B, DC power supply 60 is comprised of a transformer 132 whose primary winding 134 is preferably connected to the 120 VAC power source 26 through switch 32 (see FIG. 1). It will be understood by those having skill in the art that any suitable power transformer may be used however, in the present practice of the invention a transformer 132 having a 24 VAC center-tapped secondary winding 136, manufacturer's part No. 10526617, obtainable from Transformer Manufacturer's Inc., 7051 W. Wilson Avenue, Chicago, Ill. 60656 has been found satisfactory. Transformer secondary winding 136 has a nominal 15 watt capacity. Diodes 138 rectify the secondary voltage from transformer 132, and a 500 mf capacitor 140 provides filtering for the "$V_c$" DC power supply lead 142, which provides a nominally +12 volts to the remaining circuits.

Referring again to FIG. 4A, switches 144a through 144d and associated circuitry comprise program input switches 12 (shown in FIGS. 1 and 2). Momentarily closing switch 144a will set latch 124a and provide a "1" reset pulse on lead 122, resetting latches 74, and 124b through d. When a "1" is simultaneously applied to both S and R inputs of latch 124a by closing switch 144a, it has been found that in the circuit shown, comprising a 10K resistor 148a and a diode 150a, latch 124a remains "set" after switch 144a is opened. In a similar manner, each of switches 144b through d will cooperate with the respective combination of one of 10K resistors 148b through d and a corresponding diode 150b through d to "set" the associated latch and reset all other latches. When latch 124a is set, light-emitting diode or LED 152a is turned on, giving a visible indication that latch 124a is set. LED's 152b through d operate in a similar manner for latches 124b through d. A 1K resistor 154 provides a path to circuit common and, collectively with LED's 152a through d, comprises program display 16.

A pair of 44 ohm resistors 160 and 162 and a 2K potentiometer 164 (which is connected as a variable resistor and nominally set for 1135 ohms) collectively comprise a resistor ladder 166 capable of providing a heating schedule to sensor 24. Ladder 166 is powered by one of latches 124a through d to provide a voltage divider whose output is on lead 80. As shown, 3 temperature schedules are provided with ladder 166. Setting latch 124b provides "$V_c$" voltage at diode 156b resulting in the lowest ratio voltage divider, requiring sensor 24 to undergo the largest resistance change to provide a voltage on lead 80 equal to the reference voltage on lead 90. In a similar manner, powering ladder 166 through one of diodes 156a, 157c, or 156d results in one of two other ratio voltage dividers. Also, in a similar manner, 44 ohm resistors 168 and 170, and 2K potentiometer 172 (nominally set for 1050 ohms) collectively comprise a resistor ladder 174 capable of providing a cooling schedule to sensor 24. Diodes 158a through d power ladder 174 to provide one of three voltage divider ratios at lead 82. $T_e$, $T_f$, and $T_g$ denote respectively high, intermediate, and low heating schedule temperatures; and $T_h$, $T_i$, and $T_j$ denote respectively high, intermediate, and low cooling schedule temperatures. When the component values described hereinabove are employed the heating schedule temperatures are: $T_e=150°$ F. (66° C.), $T_f=135°$ F. (57° C.), $T_g=120°$ F. (49° C.), and the cooling schedule temperatures will be $T_h=115°$ F. (46° C.), $T_i=105°$ F. (41° C.), $T_j=90°$ F. (32° C.). When switch 144a is closed a combination of $T_f$ for the heating schedule and $T_h$ for the cooling schedule is programmed or selected to provide, in the embodiment described and shown herein, a "woolen" drying program suitable for woolen fabrics. Closing switch 144b selects a general purpose or "regular" drying program which comprises schedule pair $T_e$, $T_i$. Closing switch 144c selects a "permanent press" drying program comprised of $T_f$, $T_i$. Closing switch 144d selects a "delicate" drying program comprising $T_g$, $T_j$, and giving the relatively lowest temperature drying program with a desired maximum heating temperature $T_g=120°$ F. (49° C.) and a desired final temperature $T_j=90°$ F. (32° C.) for the heating and cooling schedules respectively.

Referring now particularly to FIG. 4B, heating cycle comparator 70 accepts the reference voltage on lead 90 from a voltage divider comprising a pair of 2.2K resistors 176 and 178. At the beginning of the heating cycle, heating cycle memory or latch 74 is in a reset state, with its $\bar{Q}$ output providing a "1" on lead 78. A 10K base resistor 180 turns on heater relay driver transistor 182, which is perferably a type 2N3392. Heater relay 18 may be any suitable 12 VDC relay and is energized (closing HR contacts 38) when transistor 182 is switched on. A diode 184 protects transistor 182 against inductive transients when relay 18 is deenergized. At the point in the drying program where the selected heating schedule temperature is attained, sensor 24 provides sufficient resistance to change the voltage divider ratio of ladder 166 and sensor 24 by an amount which increases the voltage on lead 80 until it equals the reference voltage on lead 90. Comparator 70 will then switch from a "0" to a "1" output, setting latch 74, causing a "1" on lead 76 and a "0" on lead 78. Heater relay 18 is deenergized, opening HR contacts 38, thereby deactuating heater 36. When diode 86 conducts, lead 80 receives a nominal + 0.5 volts, removing the heating schedule from sensor 24 by the blocking action of diode 88. At the same time, diode 84 will become reverse biased, permitting the selected cooling schedule from ladder 174 to be applied to sensor 24 through diode 97.

At this "crossover" point (from the heating cycle to the cooling cycle in the drying program, diode 84 enables comparator 72 by releasing lead 82 from a nominal +0.5 volts maintained thereon during the heating cycle. Prior to "crossover", the output of cooling cycle comparator 72 was a "0", because of the reference voltage on lead 96, provided by a pair of 2.2K resistors 186 and 188. Immediately after "crossover", the voltage on lead 82 will be greater than the reference voltage on lead 96, causing the output of comparator 72 to go to a "1". Heater 36 is then deactuated causing drying air temperature to gradually decrease, thereby causing sensor 24 to decrease in resistance. As the desired final temperature is approached sensor 24 decreases in resistance thereby reducing the voltage divider ratio of ladder 174 and sensor 24. At the point where the voltage on lead 82 equals the reference voltage on lead 96, the output of comparator 72 switches from a "1" to a "0". Referring to FIGS. 2 and 4B, lead 98 is in series with two digital logic inverters 190 and 192 (RCA manufacturer's type CD4049), shown between leads 98a and 98b, the inverters being omitted in FIG. 2 for simplicity. Inverters 190 and 192 provide a faster "1" to "0" transition than is obtained from comparator 72. The "1" to "0" transition on lead 98b is coupled through 0.05 mf capacitor 102 and appears on lead 100 as a negative going pulse at the input to timer 66. A 10K pullup resistor 194 holds lead 100 at a "1" in the absence of such a negative going pulse. A megohm resistor 196 and a 22 mf capacitor 198 are connected to timer 66 and give a nominal 60 second "1" output pulse on lead 104 in response to the negative going pulse on lead 100. The "1" output pulse on lead 104 resets all latches through diode 68 and lead 122, and turns off motor 40 (see FIG. 1) by energizing motor relay 20 through a 10K resistor 200, and a type 2N3392 transistor 202.

A diode 204 protects transistor 202 against inductive transients. When motor relay 20 is energized, it opens MR contacts 54, removing power from motor 40. The "1" pulse on lead 104 also powers an integrated circuit 206, preferably an RCA manufacturer's type CD4049 Hex Inverter/Buffer, connected to operate as a nominal 2 KHz oscillator 207 with a 3.9 megohm resistor 208, a 160K resistor 210, a 0.001 mf capacitor 212, and alarm 22.

Alarm 22 in the preferred embodiment is a manufacturer's type 105CFB ceramic audio tone transducer, available from Gulton Industries, Inc. Piezo Products Div., 300 State College Blvd., Fullerton, CA 92631. However, it will be understood that other suitable devices may be employed for alarm 22. The particular device described is what provides an audible signal for the duration of the nominal 60 second "1" pulse on lead 104.

The audible signal from alarm 22 indicates that the clothes in the dryer are at the desired final temperature and should be removed.

Referring to FIGS. 5 and 6, sensor 24 is shown in an enclosure or assembly 214, having a cover 216 and an electrically insulating base 218. Sensor or thermistor 24 has its leads 220 and 222 preferably formed to support sensor body 224 in a parallel spaced relationship to inside cover face 226. Lead 222 is insulated by an electrically non-conductive sleeve 228. Leads 220 and 222 are preferably mechanically and electrically bonded at interfaces 230a and 230b by suitable techniques, as for example soldering or welding to terminals 232 and 234 respectively. Terminals 232 and 234 have projections 236 and 238 extending away from base 218 to permit rapid and convenient electrical connection to sensor 24.

Cover 216 has apertures 240 and 242 to provide means to mechanically mount enclosure 214. Preferably enclosure 214 is mounted such that outside cover face 244 is exposed to the region whose temperature is to be sensed by sensor 24. The spacing of sensor body 224 with respect to inside cover face 226, provides a thermal lag between the temperature at outside cover face 244 and sensor body 224. The thermal lag provides an averaging or integrating effect, thus making sensor 24 less sensitive to transient temperature fluctuations than it would be if in direct thermal contact with the region to be sensed. Furthermore, an "offset" effect is provided as a given temperature is approached when the response of sensor 24 to an increasing temperature is compared to response of sensor 24 to a decreasing temperature, (assuming the temperature rate of change is faster than the thermal lag). Sensor 24 thus operates with an apparent offset during dynamic temperature sensing. In the present practice of the invention, a spacing of 0.0625 inches (1.589 mm) between sensor body 224 and inside cover face 226 is preferred, although a spacing in the range of 0.05 to 0.10 inches (1.27 to 2.54 mm) is satisfactory.

It is to be understood that the invention has been described with reference to the preferred embodiment, and that the preferred embodiment is susceptible of modification as will be apparent to those skilled in the art, as for example substituting a negative temperature coefficient thermistor for sensor 24 and adapting electrical circuit 10 to operate properly therewith. Accordingly, the invention is to be construed as limited only by the following claims.

What is claimed is:

1. A control system for a clothes dryer comprising:
   a. heating means operable upon selective actuation to heat air in a region for drying clothes;
   b. selector means operative upon operator actuation to select one from a plurality of predetermined cooling temperature schedules;
   c. a single sensor receiving said selected cooling schedule and operative to provide a temperature signal having a predetermined ratio to the schedule selected and which varies in continuous relationship to the air temperature in said region; and
   d. control means receiving said temperature signal and operative upon deactuation of said heating means to cool the air in said region and thereafter terminate said cooling in response to said temperature signal matching a desired final temperature in said selected cooling schedule.

2. The control system of claim 1, wherein said sensor means comprises a positive temperature coefficient thermistor.

3. The control system of claim 1, wherein said sensor means comprises a negative temperature coefficient thermistor.

4. The control system of claim 1, wherein
   a. said selector means further selectively provides one from a plurality of predetermined heating schedules each having a distinct desired heating temperature as an end point for said heating schedule;
   b. said sensor further receives said selected heating schedule; and
   c. said control means further
      i. receives said temperature signal during application of said selected heating schedule,
      ii. is operative to actuate said heating means upon receipt of said temperature signal during application of said selected heating schedule to heat the air in said region in accord with said heating schedule, and
      iii. is operative in response to said temperature signal matching said desired heating temperature to deactuate said heating means and remove said selected heating schedule from said sensor and permit said sensor to thereafter receive said selected cooling schedule.

5. A control system for a clothes dryer of the type having a heating means to dry clothes during a drying program with heated air as a working fluid, the control system comprising:
a. sensor means operative to receive a selected predetermined cooling schedule input and to sense the temperature of said heated air and to provide a temperature signal continuously representative of said heated air temperature and scaled by said selected cooling schedule; and
b. control means receiving said temperature signal and operative to
  i. compare said temperature signal with a desired final cooling temperature, and
  ii. terminate said drying program when said desired final cooling temperature is matched by said temperature signal; and
c. selector means operable to supply one from a plurality of cooling temperature schedules to said sensor means when actuated by an operator and to provide an output indicative thereof.

6. An improvement in control systems for clothes dryer of the type wherein moisture is removed from clothes by evaporation at an elevated air temperature substantially in excess of indoor room temperature the improvement comprising:
a. selector means operable upon operator actuation to select one schedule from a plurality of cooling schedules each schedule having a distinct desired final temperature, said selector means further operable to provide an output indicative of said selected schedule;
b. sensor means operative to
  i. receive said selected schedule,
  ii. continuously monitor said elevated air temperature, and
  iii. provide a continuous temperature signal in fixed relationship to said selected cooling schedule and representative of said elevated air temperature; and
c. control means receiving said temperature signal from said sensor means and operative to cause said elevated air temperature to decrease during a cooling cycle to the selected desired final temperature of said selected schedule and thereupon terminate said cooling cycle upon said temperature signal representing that said desired final temperature has been reached.

7. The improvement of claim 6, wherein said control means further comprises audibly indicating the termination of said cooling cycle.

8. A control system for a clothes dryer comprising:
a. heating means operable upon selective actuation to heat air in a region for drying clothes;
b. selector means selectively providing upon operator actuation one from a plurality of predetermined cooling temperature schedules;
c. a sensor means operative to provide a temperature signal which varies in continuous relationship to the air temperature in said region, said sensor means including
  i. a two-lead temperature sensor having a body, and which provides a continuous electrical output signal at its leads indicative of the temperature at said sensor body,
  ii. base means adapted to mechanically support and electrically insulate said sensor,
  iii. terminal means having projections adapted to provide for electrical connection to said sensor leads exteriorly of said base means, and
  iv. cover means having outside and inside faces where said inside face and said base means define a closed cavity containing said sensor body in a spaced relationship to said inside face where said spaced relationship is sufficient to provide a thermal lag from said outside face to said sensor body in excess of that of said sensor body along; and
d. control means receiving said temperature signal and operative upon deactuation of said heating means to cool the air in said region and thereafter terminate said cooling in response to said temperature signal matching a desired final temperature in said selected cooling schedule.

9. A control system for a clothes dryer of the type having a heating means to dry clothes during a drying program with heated air as a working fluid, the control system comprising:
a. sensor means operative to receive a selected cooling schedule input and to sense the temperature of said heated air and to provide a temperature signal continuously representative of said heated air temperature and scaled by said selected cooling schedule; said sensor means including
  i. base means having thereon a pair of electrical terminals disposed in spaced relationship and adapted for connection thereto,
  ii. resistance means including structure operatively connected to said pair of electrical terminals for receiving current flow therethrough upon connection of said terminals to an electrical source, said resistance means including heat sensitive structure disposed in spaced relationship to said base means for thermal isolation therefrom, and
  iii. cover means disposed over said heat sensitive structure and attached to said base means, said cover means including heat receiving structure disposed in spaced relationship to said heat sensitive structure of said resistance means for providing thermal lag in the response of said heat sensitive structure when said cover means is disposed proximate a source of heat;
b. control means receiving said temperature signal and operative to
  i. compare said temperature signal with a desired final cooling temperature and
  ii. terminate said drying program when said desired final cooling temperature is matched by said temperature signal; and
c. selector means operable upon operator actuation to supply one from a plurality of predetermined cooling temperature schedules to said sensor means when actuated by an operator and to provide an output indicative thereof.

* * * * *